United States Patent
Desai et al.

(10) Patent No.: US 10,133,713 B2
(45) Date of Patent: *Nov. 20, 2018

(54) DOMAIN SPECIFIC REPRESENTATION OF DOCUMENT TEXT FOR ACCELERATED NATURAL LANGUAGE PROCESSING

(71) Applicant: International Business Machines Corporation, Armonk, NY (US)

(72) Inventors: Rajesh M. Desai, San Jose, CA (US); Alon S. Housfater, Vaughan (CA); Philip E. Parker, York, SC (US); Roger C. Raphael, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 211 days.

This patent is subject to a terminal disclaimer.

(21) Appl. No.: 15/177,105

(22) Filed: Jun. 8, 2016

(65) Prior Publication Data

US 2016/0371239 A1    Dec. 22, 2016

Related U.S. Application Data

(63) Continuation of application No. 14/746,327, filed on Jun. 22, 2015, now Pat. No. 9,898,447.

(51) Int. Cl.
*G06F 17/28* (2006.01)
*G06F 17/22* (2006.01)
(Continued)

(52) U.S. Cl.
CPC ............ *G06F 17/2264* (2013.01); *G06F 9/00* (2013.01); *G06F 9/46* (2013.01); *G06F 17/277* (2013.01);
(Continued)

(58) Field of Classification Search
CPC ............. G06F 17/30734; G06F 17/277; G06F 17/2735; G06F 17/30312; G06F 17/30321;
(Continued)

(56) References Cited

U.S. PATENT DOCUMENTS 6,327,561 B1    12/2001    Smith et al.
7,027,974 B1    4/2006    Busch et al.
(Continued)

OTHER PUBLICATIONS

Burman, M. and B. Kase, "CUDA Grep", [online], [Retrieved on Jun. 18, 2015]. Retrieved from the Internet at <URL: http://www.cs.cmu.edu/afs/cs/academic/class/15418-s12/www/competition/bkase.github.c...>, Total 3 pp.

Granicz, A. and J. Hickey, "Phobos: A Front-End Approach to Extensible Compilers", California Institute of Technology, 36th Hawaii International Conference on Systems Sciences, IEEE Computer Society; 2003, Total 23 pp.

(Continued)

*Primary Examiner* — Richard Zhu
(74) *Attorney, Agent, or Firm* — Janaki K Davda; Konrad, Raynes, Davda & Victor LLP

(57) ABSTRACT

Provided are techniques for a domain specific representation of document text for accelerated natural language processing. A document is selected from a set of documents to be analyzed. A character stream from the document is converted into a token stream based on tokenization rules. Irrelevant tokens are removed from the token stream. The tokens remaining in the token stream are converted into an integer domain representation based on a domain specific ontology dictionary. The integer domain representation are stored to a Graphics Processing Unit (GPU) processing queue of each of one or more GPUs. Then, a result set is received from the one or more GPUs.

8 Claims, 11 Drawing Sheets

(51) Int. Cl.
  *G06T 1/20* (2006.01)
  *G06F 17/27* (2006.01)
  *G06F 9/00* (2006.01)
  *G06F 9/46* (2006.01)
  *G06F 17/30* (2006.01)

(52) U.S. Cl.
  CPC .... *G06F 17/2735* (2013.01); *G06F 17/30312* (2013.01); *G06T 1/20* (2013.01); *G06F 17/30321* (2013.01); *G06F 17/30654* (2013.01); *G06F 17/30734* (2013.01); *G06F 17/30946* (2013.01)

(58) Field of Classification Search
  CPC ......... G06F 17/30324; G06F 17/30327; G06F 17/3033; G06F 17/30333; G06F 17/30366; G06F 17/30654; G06F 17/30672; G06F 17/30946; G06F 17/30949; G06F 17/30952; G06F 17/30
  See application file for complete search history.

(56) References Cited

U.S. PATENT DOCUMENTS

| | | | |
|---|---|---|---|
| 7,702,629 | B2 | 4/2010 | Cytron et al. |
| 8,219,385 | B2 | 7/2012 | Sprecher et al. |
| 8,429,179 | B1 | 4/2013 | Mirhaji |
| 8,548,979 | B2 | 10/2013 | Chen et al. |
| 8,612,208 | B2 | 12/2013 | Cooper |
| 8,887,160 | B2 | 11/2014 | Lehavi et al. |
| 2005/0273450 | A1 | 12/2005 | McMillen et al. |
| 2008/0010274 | A1 | 1/2008 | Carus et al. |
| 2010/0250522 | A1 | 9/2010 | Chakrabarty |
| 2011/0252046 | A1* | 10/2011 | Szabo ............... G06F 17/30985 707/758 |
| 2012/0310895 | A1* | 12/2012 | Hoog ............... G06F 17/30569 707/675 |
| 2012/0317136 | A1 | 12/2012 | Papish et al. |
| 2013/0086096 | A1* | 4/2013 | Indeck ............... G06F 17/30312 707/758 |
| 2013/0311166 | A1 | 11/2013 | Yanpolsky |
| 2014/0156282 | A1 | 6/2014 | Madere et al. |

OTHER PUBLICATIONS ip.com, "GPU Accelerated Tokenization in Natural Language Processing Systems"; An IP.com Prior Art Database Technical Disclosure; http://ip.com/IPCOM/000239417; Nov. 5, 2014, Total 4 pp.

ip.com, "Method and System for Cross-domain Gathering of Relevant Information"; An IP.com Prior Art Database Technical Disclosure; http://ip.com/IPCOM/000240506; Feb. 4, 2015, Total 5 pp.

Mell, P. and T. Grange, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Mell, P. and T. Grange, "The NIST Definition of Cloud Computing (Draft)", Jan. 2011, Computer Security Division Information Technology Laboratory National Institute of Standards and Technology, Total 7 pp.

Preliminary Amendment, dated Jun. 8, 2016, for U.S. Appl. No. 14/746,327, filed Jun. 22, 2015 by R.M. Desai et al., Total 7 pp. [57.359 (PrelimAmend)].

U.S. Appl. No. 14/746,327, filed Jun. 22, 2015, entitled "A Domain Specific Representation of Document Text for Accelerated Natural Language Processing", invented by R.M. Desai et al., Total 37 pp. [57.359 (Appln)].

List of IBM Patents or Patent Applications Treated as Related, Jun. 8, 2016, Total 2 pp.

Notice of Allowance, dated Oct. 5, 2017, for U.S. Appl. No. 14/746,327, filed Jun. 22, 2015 by R.M. Desai et al., Total 10 pp. [57.359 (NOA)].

Final Office Action, dated Jun. 16, 2017, for U.S. Appl. No. 14/746,327, invented by R.M. Desai et al., filed Jun. 22, 2015, Total 18 pages.

Response to Final Office Action, dated Sep. 1317, for U.S. Appl. No. 14/746,327, invented by R.M. Desai et al., filed Jun. 22, 2015, Total 12 pages.

Office Action, dated Feb. 24, 2017, for U.S. Appl. No. 14/746,327, filed Jun. 22, 2015 by R.M. Desai et al., Total 25 pp. [57.359].

Response to Office Action, dated May 24, 2017, for U.S. Appl. No. 14/746,327, filed Jun. 22, 2015 by R.M. Desai et al., Total 21 pp. [57.359].

* cited by examiner

DOMAIN SPECIFIC REPRESENTATION OF DOCUMENT TEXT FOR ACCELERATED NATURAL LANGUAGE PROCESSING

FIELD

Embodiments of the invention relate to a domain specific representation of document text for accelerated natural language processing. In particular, embodiments relate to a domain specific symbolic compression for documents that use Regular Expression (REGEX) for Graphics Processing Unit (GPU) assisted natural language processing.

BACKGROUND

In some Information Retrieval (IR) systems, there is a class of extraction techniques that rely on finding patterns of tokens that occur within a document. These IR systems look for a pattern within the specific language constructs and proceed to do so by first converting a document that is essentially a character stream into something more usable for downstream processing, called a token stream. However, most IR systems stop at that point and move on to process token streams as base primitives representing the document. The IR systems tend to incur a lot of Central Processing Unit (CPU) cycles searching for the tokens within the document, which are essentially strings, thereby, incurring the cost of primitives (e.g., string comparisons) at the character level for most of the downstream processing.

Such processing techniques are not conducive to GPU architectures that require conservative data movement between a CPU host and a target GPU. It is also expensive to process tokens on a character level and look for these tokens within the constraints of GPU Single Instruction, Multiple Data (SIMD) processing.

SUMMARY

Provided is a method for a domain specific representation of document text for accelerated natural language processing. The method comprises: selecting a document from a set of documents to be analyzed; converting a character stream from the document into a token stream based on tokenization rules; removing irrelevant tokens from the token stream; converting tokens remaining in the token stream into an integer domain representation (e.g., into integers) based on a domain specific ontology dictionary; storing the integer domain representation to a Graphics Processing Unit (GPU) processing queue of each of one or more GPUs; and receiving a result set from the one or more GPUs.

Provided is a computer program product for a domain specific representation of document text for accelerated natural language processing. The computer program product comprises a computer readable storage medium having program code embodied therewith, the program code executable by one of a Central Processing Unit (CPU) processor and at least one Graphics Processing Unit (GPU) processor to perform: selecting a document from a set of documents to be analyzed; converting a character stream from the document into a token stream based on tokenization rules; removing irrelevant tokens from the token stream; converting tokens remaining in the token stream into an integer domain representation based on a domain specific ontology dictionary; storing the integer domain representation to a Graphics Processing Unit (GPU) processing queue of each of one or more GPUs; and receiving a result set from the one or more GPUs.

Provided is a computer system for a domain specific representation of document text for accelerated natural language processing. The computer system comprises: one or more Central Processing Unit (CPU) processors and Graphics Processing Unit (GPU) processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform: selecting a document from a set of documents to be analyzed; converting a character stream from the document into a token stream based on tokenization rules; removing irrelevant tokens from the token stream; converting tokens remaining in the token stream into an integer domain representation based on a domain specific ontology dictionary; storing the integer domain representation to a Graphics Processing Unit (GPU) processing queue of each of one or more GPUs; and receiving a result set from the one or more GPUs.

BRIEF DESCRIPTION OF THE SEVERAL VIEWS OF THE DRAWINGS

Referring now to the drawings in which like reference numbers represent corresponding parts throughout.

DETAILED DESCRIPTION

Figure 1:
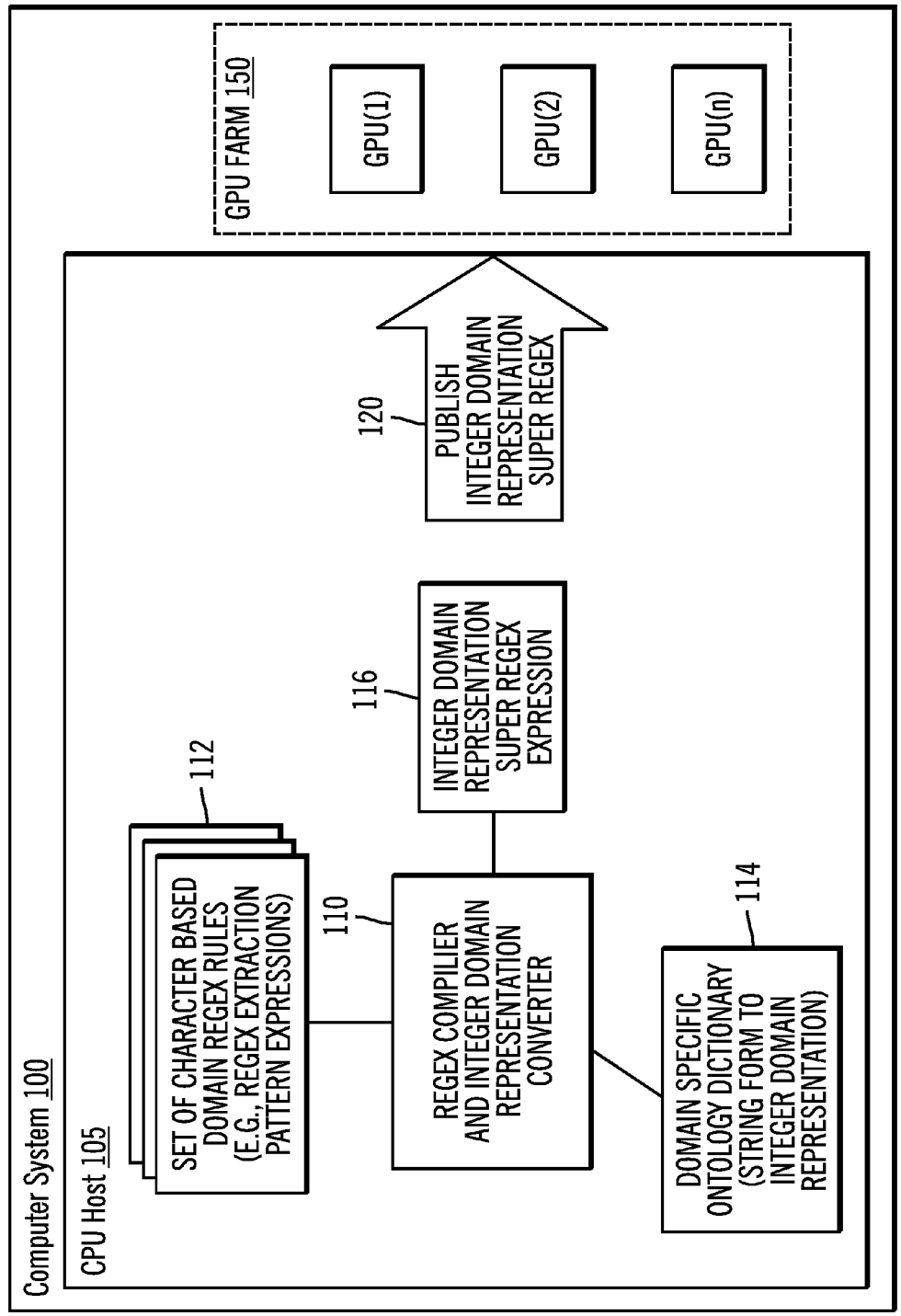
FIG. 1 illustrates, in a block diagram, a multi-processor computing environment in accordance with certain embodiments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. FIG. 1 illustrates, in a block diagram, a multi-processor computing environment for a super REGEX phase in accordance with certain embodiments. A Central Processing Unit (CPU) host 105 ("CPU host") is coupled to a GPU farm 150. The CPU host 105 includes a REGEX compiler and integer domain converter 110 that uses one or more REGEX rules from a set of character based domain REGEX rules (e.g., REGEX extraction pattern expressions) 112 and a domain specific ontology dictionary 114 ("map") to output an integer domain representation super REGEX expression. The domain specific ontology dictionary 114 is used to convert a string form (characters) to an integer domain representation. The domain specific ontology dictionary 114 may be selected from a set of domain dictionaries. Then, the REGEX compiler and integer domain converter 110 publishes the integer domain representation super REGEX expression to the GPU farm 150 (arrow 120). The GPU farm 150 is a set of GPUs (GPU(1), GPU(2), . . . GPU(n)). Each of the GPUs of the GPU farm 150 may be local or remote to the CPU host 105.

In certain embodiments, the REGEX compiler and integer domain converter 110 dynamically updates the domain specific ontology dictionary. In such embodiments, the integer domain mappings (from token to integer) is an ever growing domain specific ontology dictionary. With such embodiments, new mappings are discovered when new tokens are encountered that are relevant to the domain (e.g., by consulting the domain ontologies).

In certain embodiments, the CPU host and the GPUs are co-processors that are integrated into a single computer system. In certain alternative embodiments, the CPU host may reside on one computer system, while the GPUs are located one or more remote computer systems. In certain embodiments, the GPUs may be replaced by other CPU hosts. The CPU host may be referred to as a CPU processor or a CPU host processor. The GPU may be referred to as a GPU processor.

Figure 2:
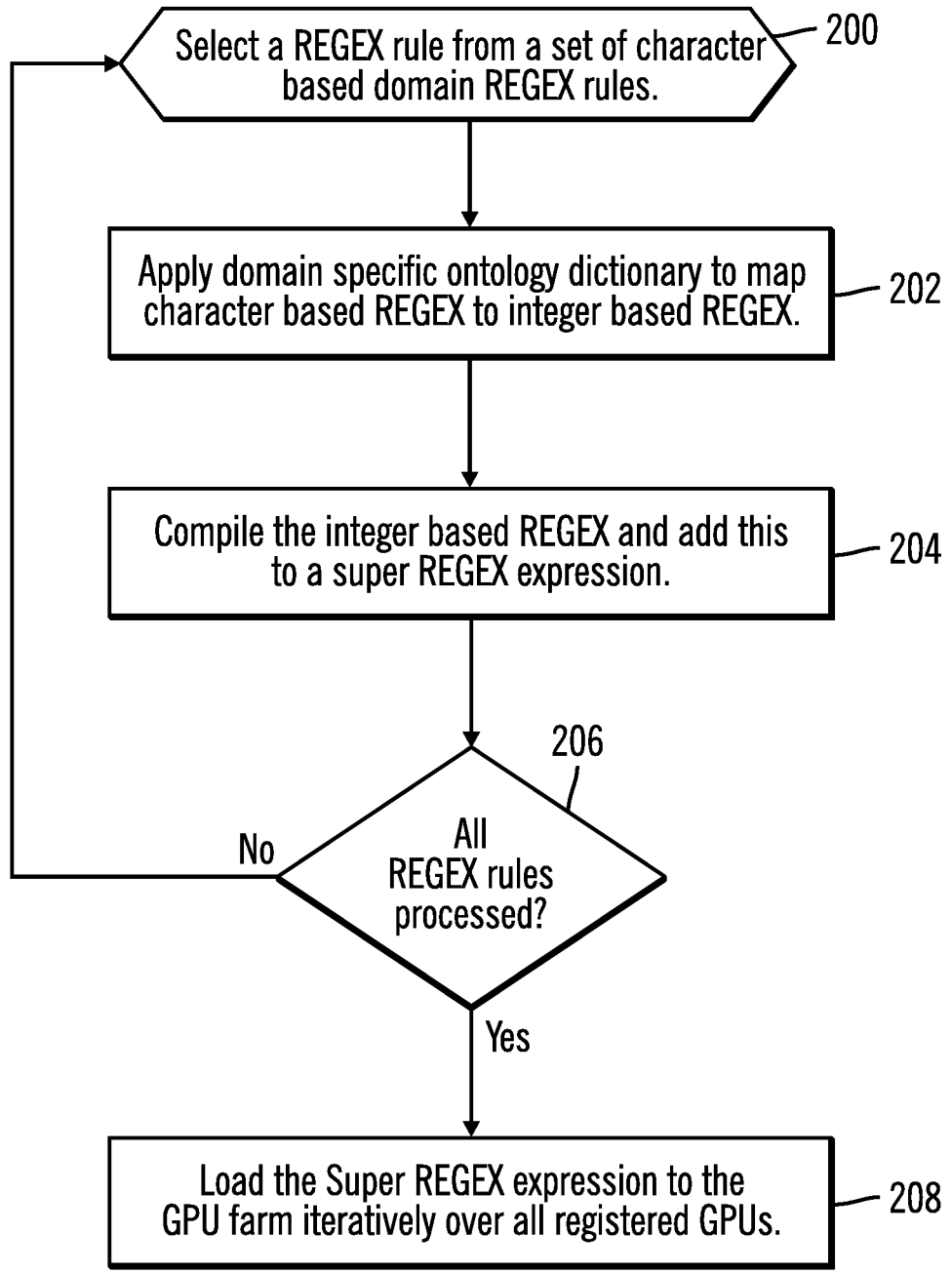
FIG. 2 illustrates, in a flow chart, operations for a compiled form of a super REGEX phase in accordance with certain embodiments.

FIG. 2 illustrates, in a flow chart, operations for a compiled form of a super REGEX phase in accordance with certain embodiments. Control begins at block 200 with the REGEX compiler and integer domain converter 110 (of the CPU host 105) selecting a REGEX rule from a set of character based domain REGEX rules. In block 202, the REGEX compiler and integer domain converter 110 applies a domain specific ontology dictionary (i.e., domain specific representation ontology dictionary rules) and the set of character based domain REGEX rules (e.g., REGEX extraction pattern expressions) to map a character based REGEX to an integer based REGEX. In block 204, the REGEX compiler and integer domain converter 110 compiles the integer based REGEX and adds this to a super REGEX expression. In block 206, the REGEX compiler and integer domain converter 110 determines whether all of the REGEX rules in the set of character based domain REGEX rules have been selected. If so, processing continues to block 208, otherwise, processing returns to block 200 to select another REGEX rule. In block 208, the REGEX compiler and integer domain converter 110 loads ("publishes") the super REGEX expression to the GPU farm iteratively over all registered GPUs (i.e., loads the super REGEX expression to each GPU in the GPU farm). In certain embodiments, the processing of FIG. 2 occurs once when the CPU host 105 is started and re-done if the REGEX extraction pattern expressions change, requiring recompilation and reload to the GPUs.

Figure 3:
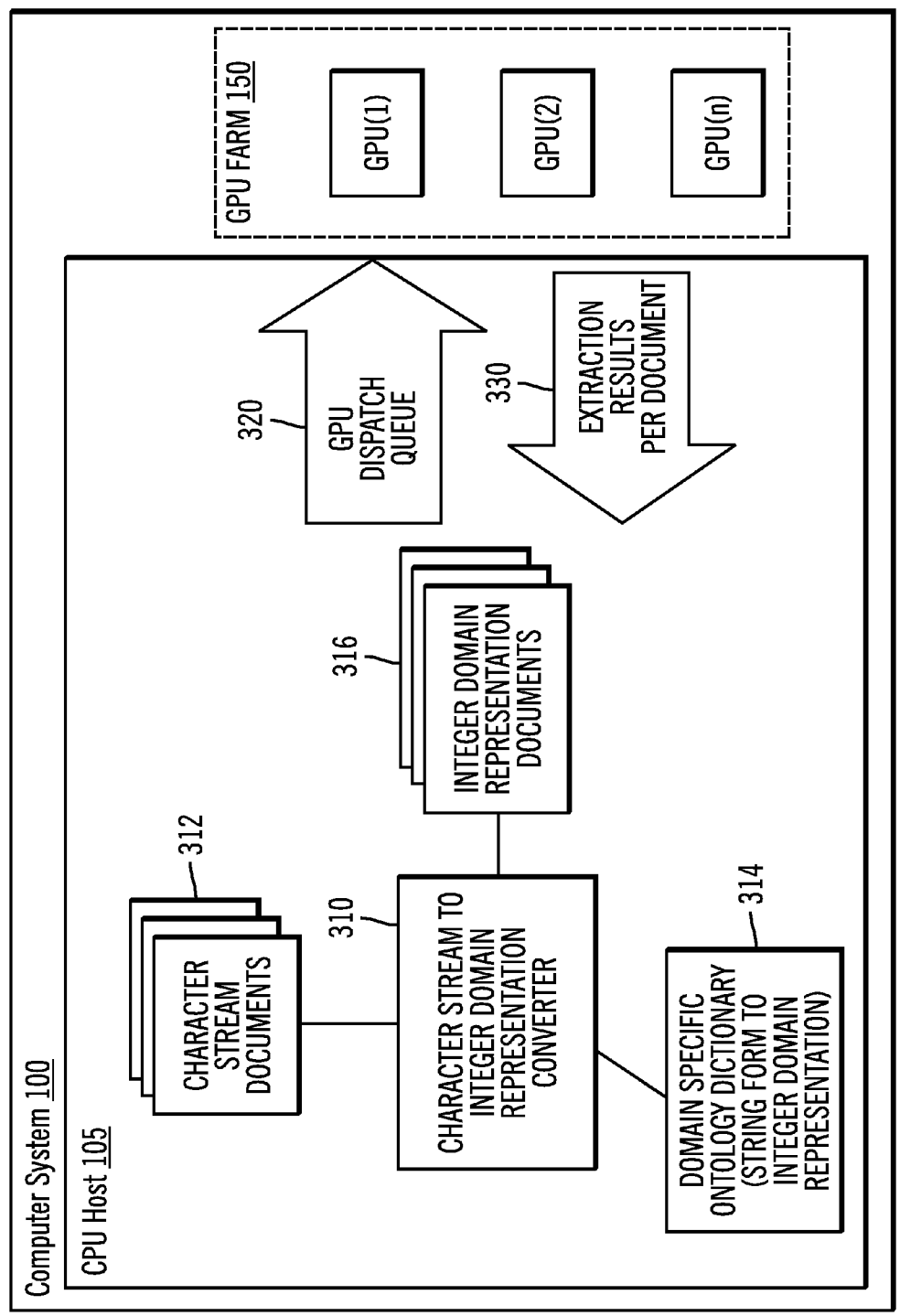
FIG. 3 illustrates, in a block diagram, a multi-processor computing environment for a CPU host side dispatch phase in accordance with certain embodiments.

FIG. 3 illustrates, in a block diagram, a multi-processor computing environment for a CPU host side dispatch phase in accordance with certain embodiments. The CPU host 105 is coupled to the GPU farm 150. The CPU host 105 includes a character stream to integer domain representation converter 310 that uses one or more character stream documents 310 and a domain specific ontology dictionary 314 ("map") to output integer domain representation documents 316. The domain specific ontology dictionary 314 is used to convert a string form (e.g., characters) to an integer domain representation. The domain specific ontology dictionary 314 may be selected from a set of domain dictionaries. In certain embodiments, the domain specific ontology dictionary 314 may be the same map as domain specific ontology dictionary 114. Then, the character stream to integer domain representation converter 310 sends the integer domain representation documents 316 to the GPU queues (arrow 320) and subsequently receives extraction result sets ("results") per integer domain representation document from the GPUs (arrow 330).

Figure 4A:
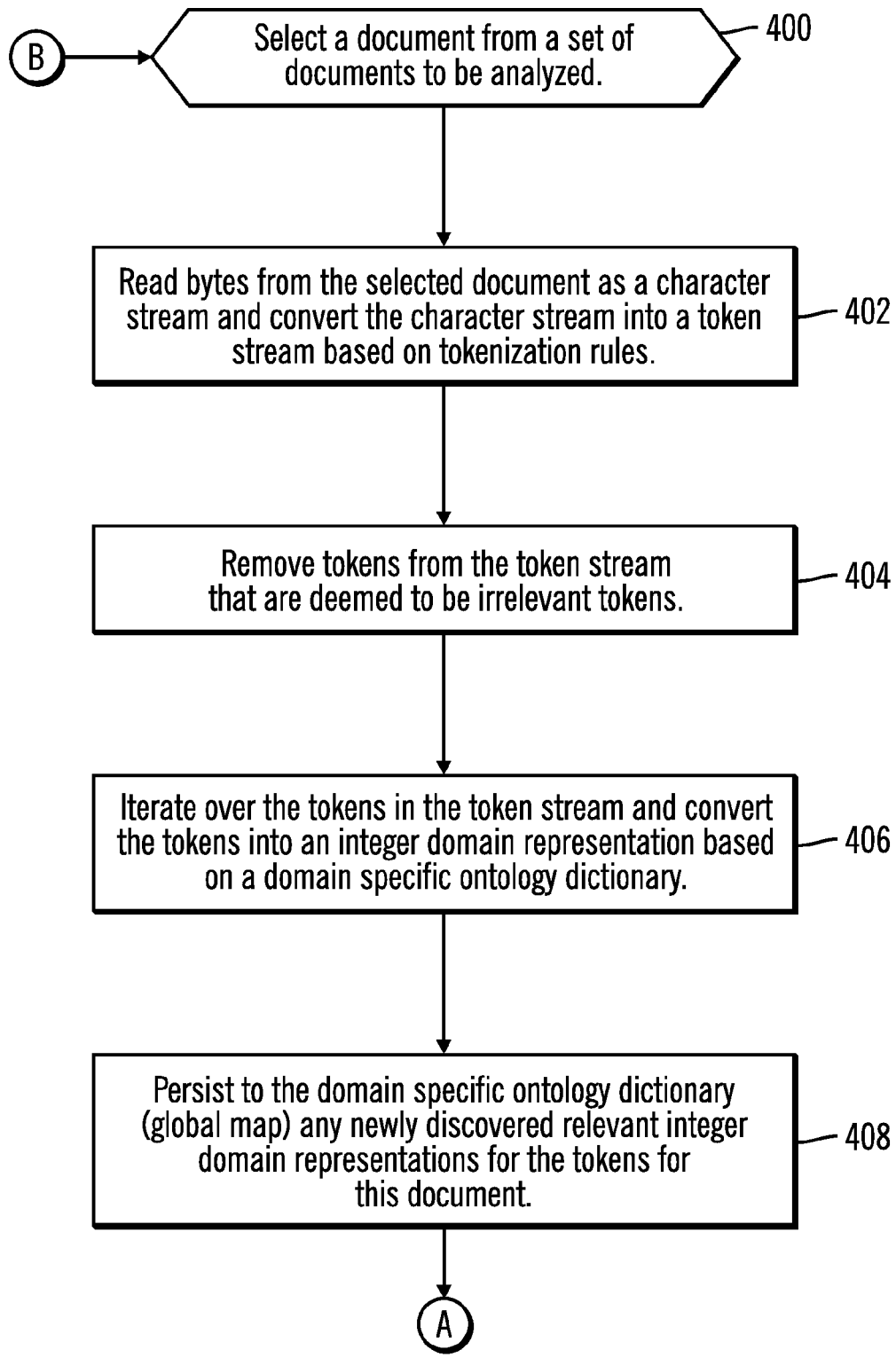
FIGS. 4A and 4B illustrate, in a flowchart, operations for a CPU host side dispatch phase in accordance with certain embodiments.
Figure 4B:
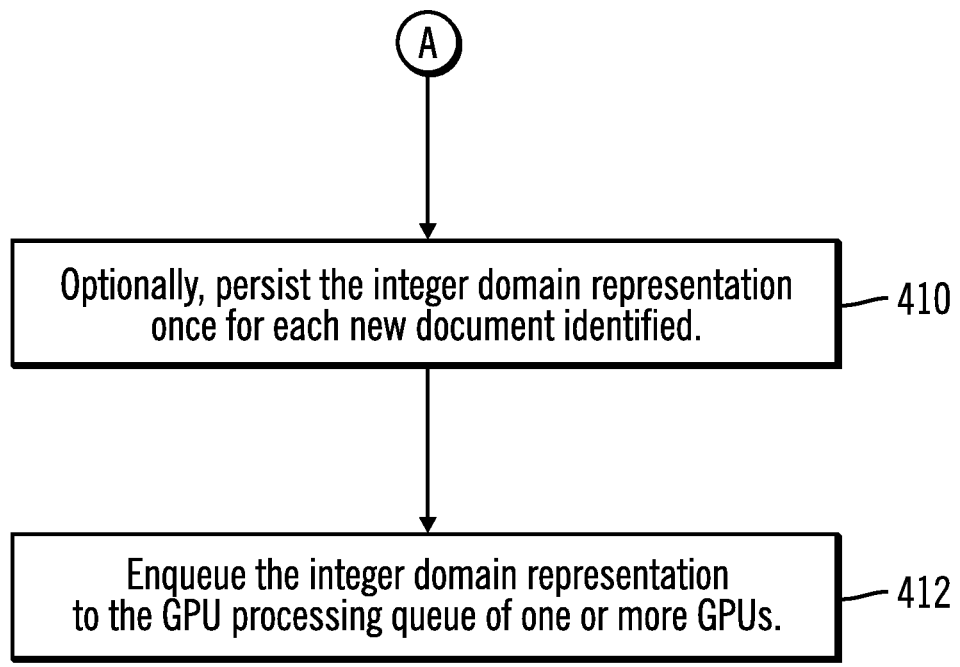

FIGS. 4A and 4B illustrate, in a flowchart, operations for a CPU host side dispatch phase in accordance with certain embodiments. Control begins at block 400 with the character stream to integer domain representation converter 310 (of the CPU host 105) selecting a document from a set of documents to be analyzed. In block 402, the character stream to integer domain representation converter 310 reads bytes from the selected document as a character stream and converts the character stream into a token stream based on tokenization rules. "Tokens" may also be referred to as "terms". The tokenization rules may include, for example, "white space characters terminate tokens". In block 404, the character stream to integer domain representation converter 310 removes tokens from the token stream that are deemed to be irrelevant tokens (i.e., that are irrelevant to the meaning/domain of analysis of the text (e.g., articles like a, the, and other articles)). In block 406, the character stream to integer domain representation converter 310 iterates over the tokens in the token stream and converts the tokens into an integer domain representation based on a domain specific ontology dictionary. In block 408, the character stream to integer domain representation converter 310 persists to the domain specific ontology dictionary (global map) any newly discovered relevant integer domain representations for tokens for this document. From block 408 (FIG. 4A), processing continues to block 410 (FIG. 4B).

In block 410, the character stream to integer domain representation converter 310, optionally, persists the integer domain representation ("integer stream representation") (e.g., to storage) once for each new document identified. This allows multiple analysis runs without raw conversion repeatedly. That is, storage of a document in integer domain representation is an optimization for future use of the same document with a different compiled super REGEX. In block 412, the character stream to integer domain representation converter 310 enqueues (i.e., stores in a queue) the integer domain representation to the GPU processing queue of one or more GPUs in the GPU farm. In certain embodiments, the integer domain representation is sent to all of the GPUs.

Figure 5:
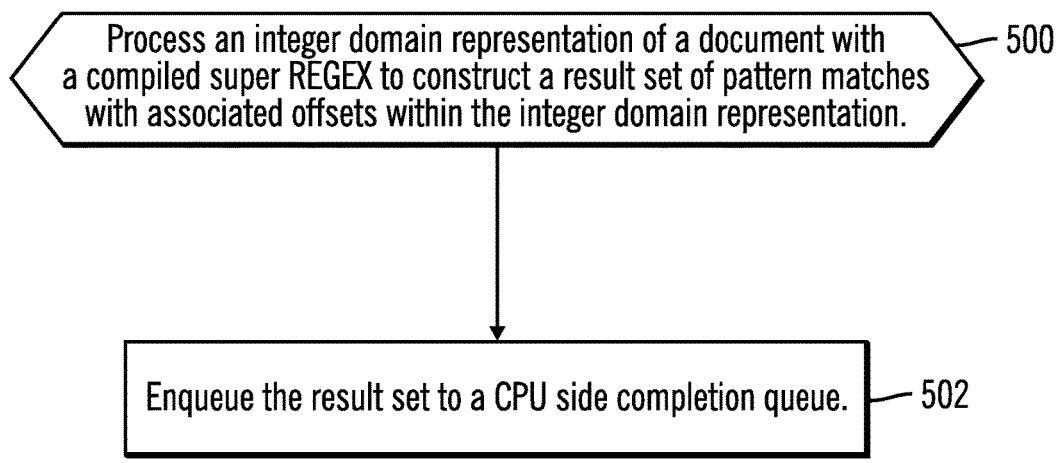
FIG. 5 illustrates, in a flow chart, operations for a GPU side main processing stage in accordance with certain embodiments.

FIG. 5 illustrates, in a flow chart, operations for a GPU side main processing stage in accordance with certain embodiments. Control begins at block 500 with the GPU processing an integer domain representation of a document with a compiled super REGEX to construct a result set of pattern matches with associated offsets within the integer domain representation. With embodiments, the integer domain representation of the document is retrieved from a GPU queue. In bock 502, the GPU enqueues (i.e., stores in a queue) the result set to a CPU host side completion queue.

Thus, in certain embodiments, the result set includes a set of pattern matches, as tuples of 1) a specific pattern and 2) the offset from the beginning of the integer domain representation document for that document. In certain embodiments, the CPU host may convert these integer domain representation offsets to character offsets.

Figure 6:
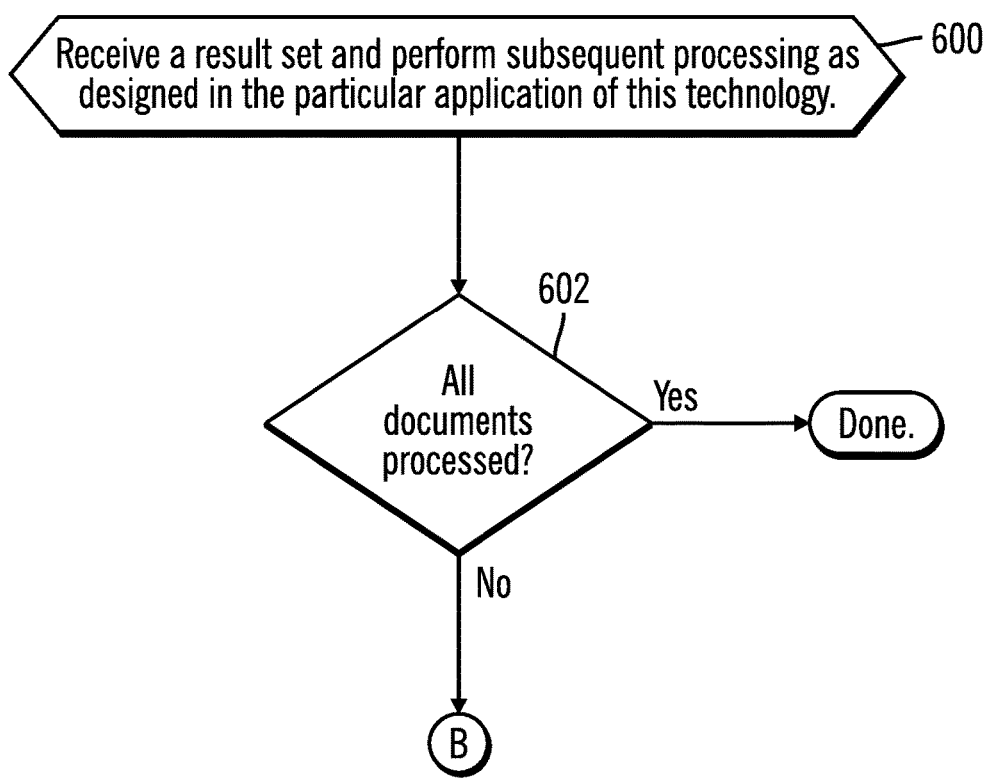
FIG. 6 illustrates, in a flowchart, operations for a CPU host side request completion phase in accordance with certain embodiments.

FIG. 6 illustrates, in a flowchart, operations for a CPU host side request completion phase in accordance with certain embodiments. Control begins at block 600 with the character stream to integer domain representation converter 310 receiving a result set from the GPUs and performing subsequent processing as designed in the particular application of this technology. In block 602, the character stream to integer domain representation converter 310 determines whether all documents have been processed. If so, processing is done, otherwise, processing returns to block 400 (FIG. 4A) to select another document.

As an example of subsequent processing as designed in the particular application of this technology, additional processing may be performed using the tokens found during processing to build more complex information extraction rules. Another example may be, if a document was too large to be processed efficiently within the confines of the GPU memory, the document may be split, and the results combined later. Another example may be a global processing operation relating tokens found in multiple documents to each other in order to find more complex patterns.

Figure 7:
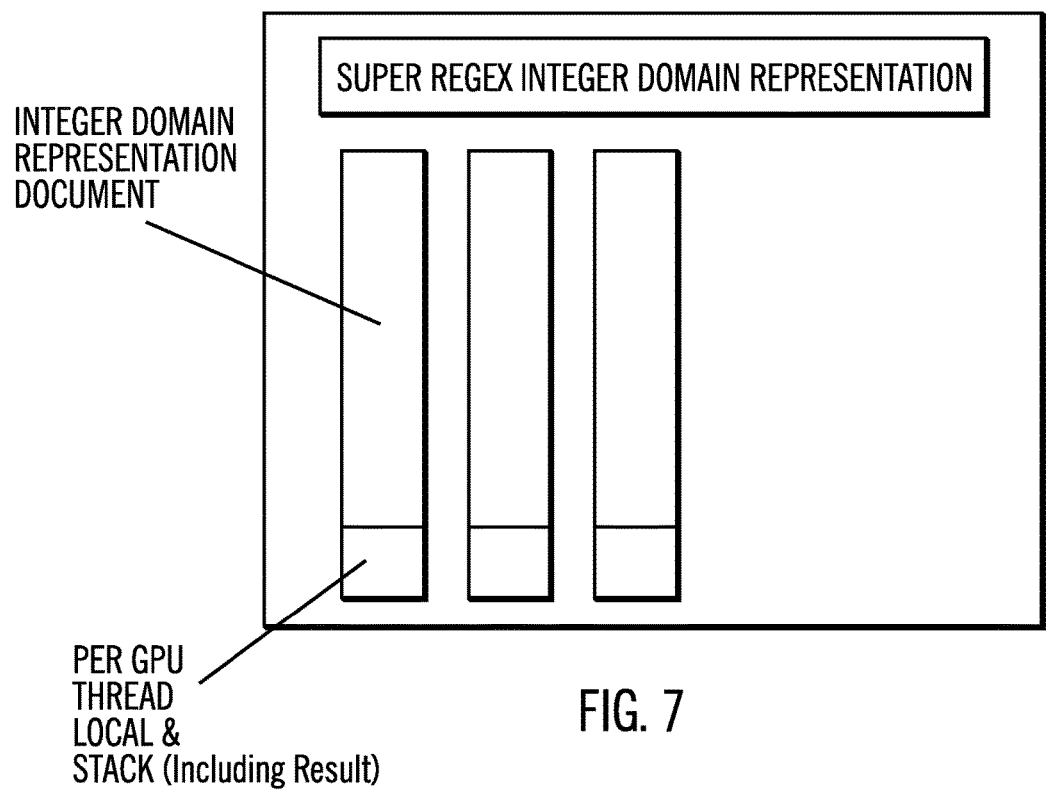
FIG. 7 illustrates, in a block diagram, a GPU memory layout in accordance with certain embodiments.

FIG. 7 illustrates, in a block diagram, a GPU memory layout in accordance with certain embodiments. FIG. 7 represents the internal organization of a GPU during runtime processing. The super REGEX is present, and multiple execution units process the documents assigned to the GPU.

In accordance with certain embodiments, there is a single domain within which the CPU host is operating to extract information (e.g., a medical domain, an auto industry domain, etc.). Embodiments may also work over multiple domains simultaneously. In certain embodiments, the act of information extraction is primarily based on REGEX extraction pattern expressions within the scope of a single document (without global analysis required). Also, in certain embodiments, the patterns are a token level REGEX expressed in a global integer domain representation.

In certain embodiments, for domain specific ontology dictionary building, this processing is embedded with the traditional tokenization step and is done on the CPU host side. This may be done at run-time with a dynamically cumulative integer allocator to each semantically relevant token based on domain ontology. Non-relevant tokens are simply ignored and not carried over from the character stream document to the integer domain document. Decisions on type conversion may be done depending on metadata information in the domain specific ontology dictionary. Also, stop list, stemming, and typo handling may be done prior to this conversion.

Embodiments encode domain terminology as a set of integers for processing by an integer-optimized regex system. GPUs have limited memory and, hence, embodiments provide a document representation that is inherently semantically compressed and that works well for SIMD style processing in the GPU world.

Embodiments convert a document semantically to a representation for the given domain of extraction, such that the converted document is conducive for a GPU offload.

In particular, embodiments enhance GPU off load by:
 a. providing a clean array of fixed size integer representation for documents, useful for SIMD processing;
 b. providing implicit compression of the base document for faster transfer in and out of the GPU and occupancy of GPU Dynamic Random-Access Memory (DRAM).
 c. converting actions of semantic information discovery to REGEX expressions that are available for GPU class execution; and
 d. executing acts of extraction (i.e., the full REGEX set may be compiled down to a single REGEX state machine) at one SIMD on the GPU. Hence, paralleling a series of sequential extraction steps down to a single GPU execution.

Embodiments are not directed only to GPUs, however, examples are provided herein with reference to GPUs to enhance understanding of embodiments of the invention. With embodiments, the optimization provides a means of utilizing GPUs in the extraction process with a higher efficiency. This technique may be used in traditional CPU environments exclusively or even hybrid environments.

Embodiments represent domain terminology as a fixed set of integers, thereby speeding up by parallelizing document level extraction using super REGEX processing via GPU acceleration over the integers.

Embodiments provide document level compression that is semantically invariant from the original character stream document representation. This primarily reduces the bandwidth demands on the Peripheral Component Interconnect Express (PCIe) bus to stream documents into the GPU. In addition, this allows higher per GPU parallelism by way of better utilization of GPU memory.

For REGEX style of information extraction at the document level, embodiments permit the GPU to use a REGEX state machine as the kernel. In certain embodiments, the REGEX expression is a union of all singleton REGEX style extraction expressions.

Embodiments permit the GPU to work on fixed word size token representation that is character set agnostic. The GPU kernel does not need to operate at the byte level and avoids dealing with multi-byte characters and other language sensitive tokenization problems.

With embodiments, an input stream of a document is considered to be a token stream. In a given domain, after non-contributing or domain level uninteresting tokens are removed from the token stream representation of the input document, the total number of relevant tokens may be mapped into an integer space (e.g., 64 bit or higher width integers).

With embodiments, there exists a domain specific ontology dictionary to instantiate the mapping by way of monotonic allocation of the integers in a thread safe and atomic way given the multitude of extractors operating in parallel. This supports a way to post new tokens and obtain a unique integer representing domain-specific terminology tokens in the global token space of the information domain. In certain embodiments, the domain specific ontology dictionary is based on the domain ontology, where there is an optimal allocation to an integer space mapping of each token in that ontology.

Non ontology based tokens may also be allocated to integers, perhaps in a different range than the ontology based tokens.

Certain embodiments have the following flow of operations:
 1. A character stream is converted to an ordered raw token stream.
 2. The ordered raw token stream is filtered to remove semantically irrelevant tokens to create an ordered relevant token stream.

3. There is iteration over the ordered relevant token stream using a domain specific ontology dictionary ("map") to convert the ordered relevant token stream to an integer domain representational form.

4. Now, subsequent processing that relies on REGEX will use REGEX expressions that have been compiled to an integer form using the same domain specific ontology dictionary and processing techniques as used to convert the input document in operation 3 above.

5. An embodiment may consider storage into a search index of the results in this form, where the search query may be processed similarly to obtain a query that is in the internal integer form, where the query may then be processed by the search index. In certain embodiments, results are not affected and are still the standard document identifier (ID) lists.

6. Extraction techniques that rely on REGEX expressions and that can avail of GPU acceleration may stream the integer representational form of the document into the GPU with the associated REGEX compiled expression into the integer space, for higher performance and GPU off load processing. In certain embodiments, it is possible that all REGEX expression extraction patterns may be pre-loaded into the GPU and/or GPU farm.

7. There is a second order benefit of the possibility to obtain higher multiple document parallelism within the GPU in this way, with a smaller semantically compressed form of a document.

With embodiments, it is understood that the integer width is sufficiently large to capture possibly all semantically relevant tokens in a global integer space. This allows a document to be reduced to a set of globally mapped ordered set of integers. With embodiments, there exists a semantic filter (e.g., maintained in the domain specific ontology dictionary) that a) determines relevancy to the domain of the token and, b) if the token is not a domain token, the token is filtered for type with an associated storage of the type value and position (e.g., by way of an index offset from the top of the document integer domain representation) outside the integer token stream being built. In certain embodiments, there are some classes of tokens that may be upgraded to a type in which value significance is not required in the act of extraction until the pattern matching is complete. That is, a group of tokens may be assigned to a group, which is assigned one integer domain representation (e.g., one integer value). This may be optimized to reduce the potential of a very large integer space developing due to all possible value representations. This may be done with the ability to track the value associated with the specific token at the relevant position within the document. There are optimized techniques that may achieve this using document token order.

In certain embodiments, there exists a mapping from an arbitrary token space to an standard symbolic integer space (e.g., possibly 32 or 64 bit) whereby any document in the textual representational space may be transformed into the integer space, such that all subsequent semantic analysis and extraction may be performed in that integer space by way of a REGEX compiled into that same integer space. This leads to improved performance obtained directly by faster REGEX processing in the integer domain, as well as, indirectly by way of compression obtained so as to do more per unit memory on a vector capable hardware as in a GPU. The mapping/transposition is per document that arrives to the CPU host and also requires the REGEX to be transposed or compiled to the same mapping. The mapping may be built on the fly so long as there is domain knowledge of relevant keywords or tokens provided to the CPU host. In certain embodiments, the integer mapping is one to one, done once, assigned uniquely by occurrence, and subsequently fixed for the lifetime of the CPU host for all document instances that arrive to the CPU host. In certain embodiments, the semantic extraction once done in the integer space is then reverted back to the standard textual space by a reverse mapping.

Cloud Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
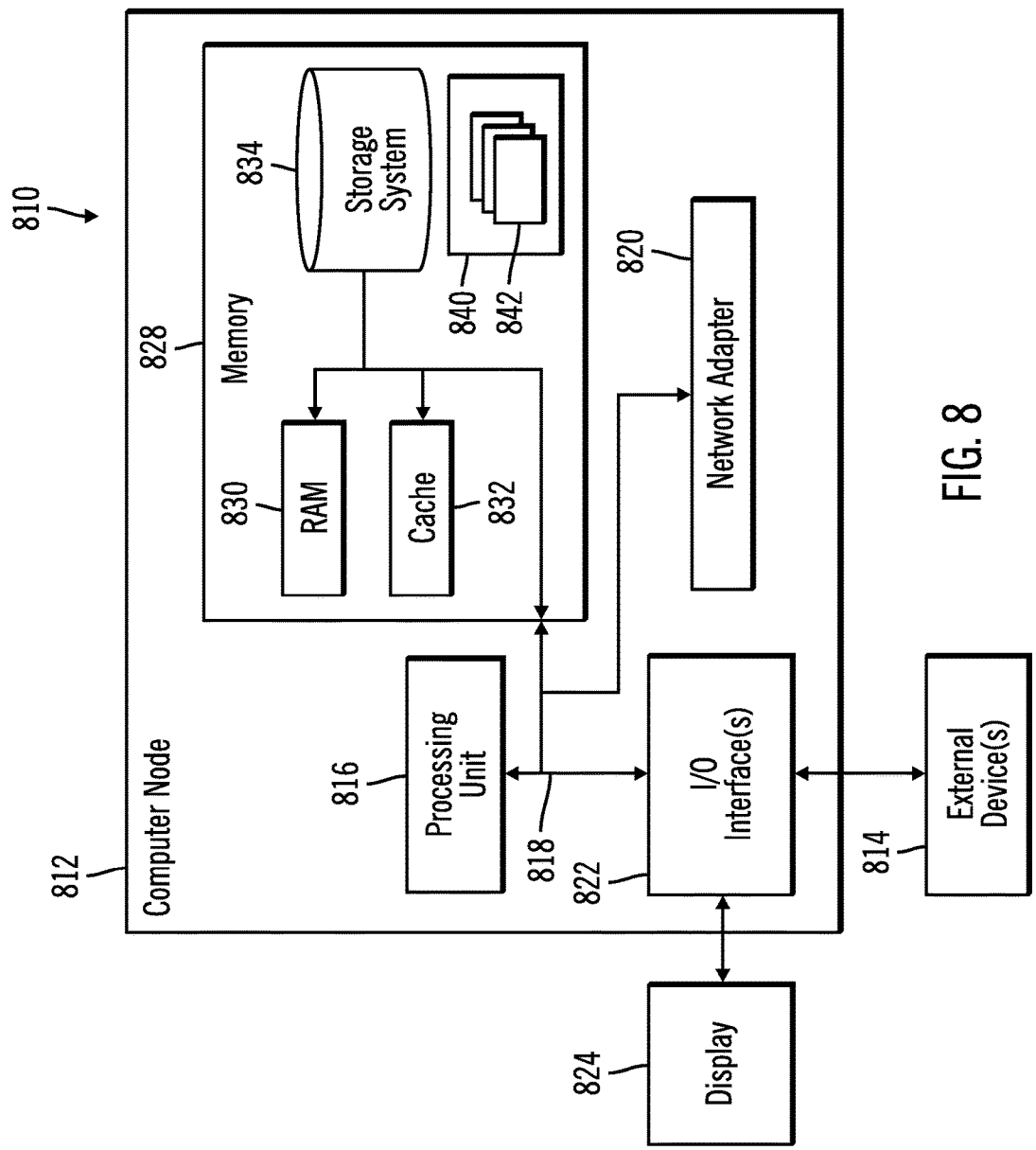
FIG. 8 illustrates a cloud computing node in accordance with certain embodiments.

Referring now to FIG. 8, a schematic of an example of a cloud computing node is shown. Cloud computing node 810 is only one example of a suitable cloud computing node and is not intended to suggest any limitation as to the scope of use or functionality of embodiments of the invention described herein. Regardless, cloud computing node 810 is capable of being implemented and/or performing any of the functionality set forth hereinabove.

In cloud computing node 810 there is a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general context of computer system executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in cloud computing node 810 is shown in the form of a general-purpose computing device. The components of computer system/server 812 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 812 typically includes a variety of computer system readable media. Such media may be any available media that is accessible by computer system/server 812, and it includes both volatile and non-volatile media, removable and non-removable media.

System memory 828 can include computer system readable media in the form of volatile memory, such as random access memory (RAM) 830 and/or cache memory 832. Computer system/server 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the invention.

Program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system/server 812 may also communicate with one or more external devices 814 such as a keyboard, a pointing device, a display 824, etc.; one or more devices that enable a user to interact with computer system/server 812; and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, tape drives, and data archival storage systems, etc.

Figure 9:
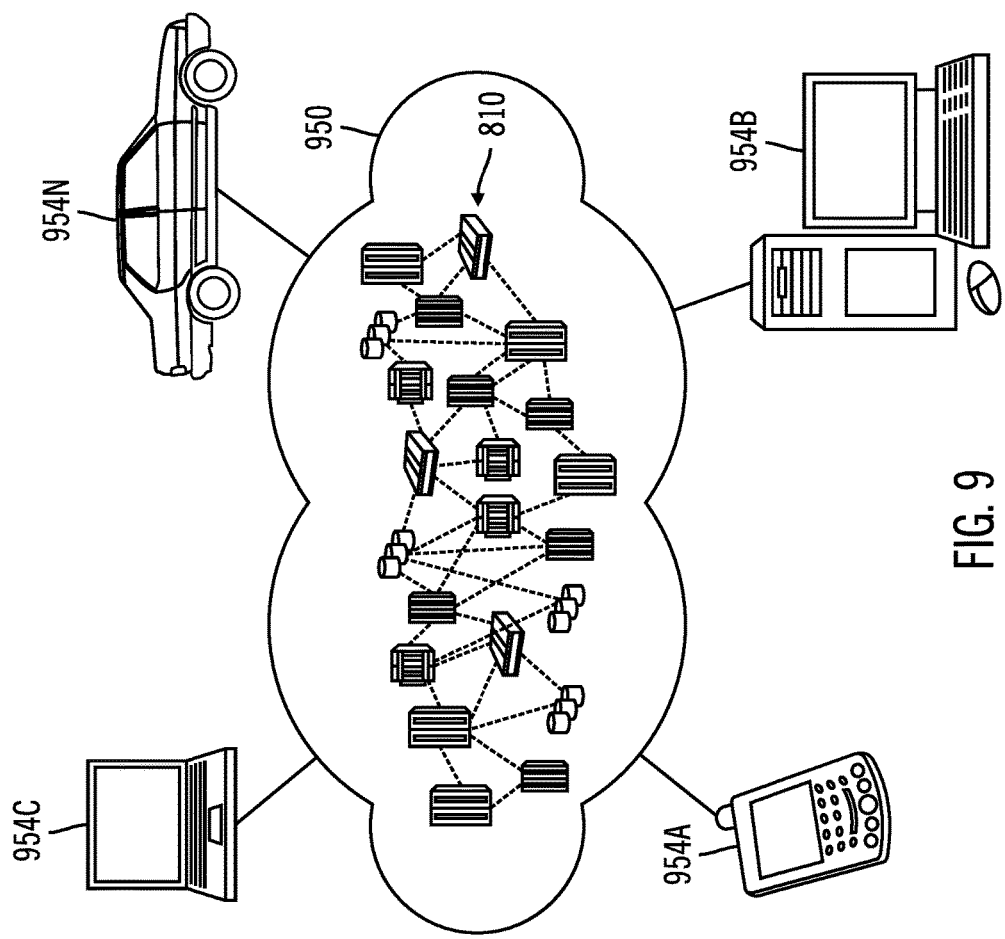
FIG. 9 illustrates a cloud computing environment in accordance with certain embodiments.

Referring now to FIG. 9, illustrative cloud computing environment 950 is depicted. As shown, cloud computing environment 950 comprises one or more cloud computing nodes 810 with which local computing devices used by cloud consumers, such as, for example, personal digital assistant (PDA) or cellular telephone 954A, desktop computer 954B, laptop computer 954C, and/or automobile computer system 954N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 810 and cloud computing environment 950 can communicate with any type of computerized device over any type of network and/or network addressable connection (e.g., using a web browser).

Figure 10:
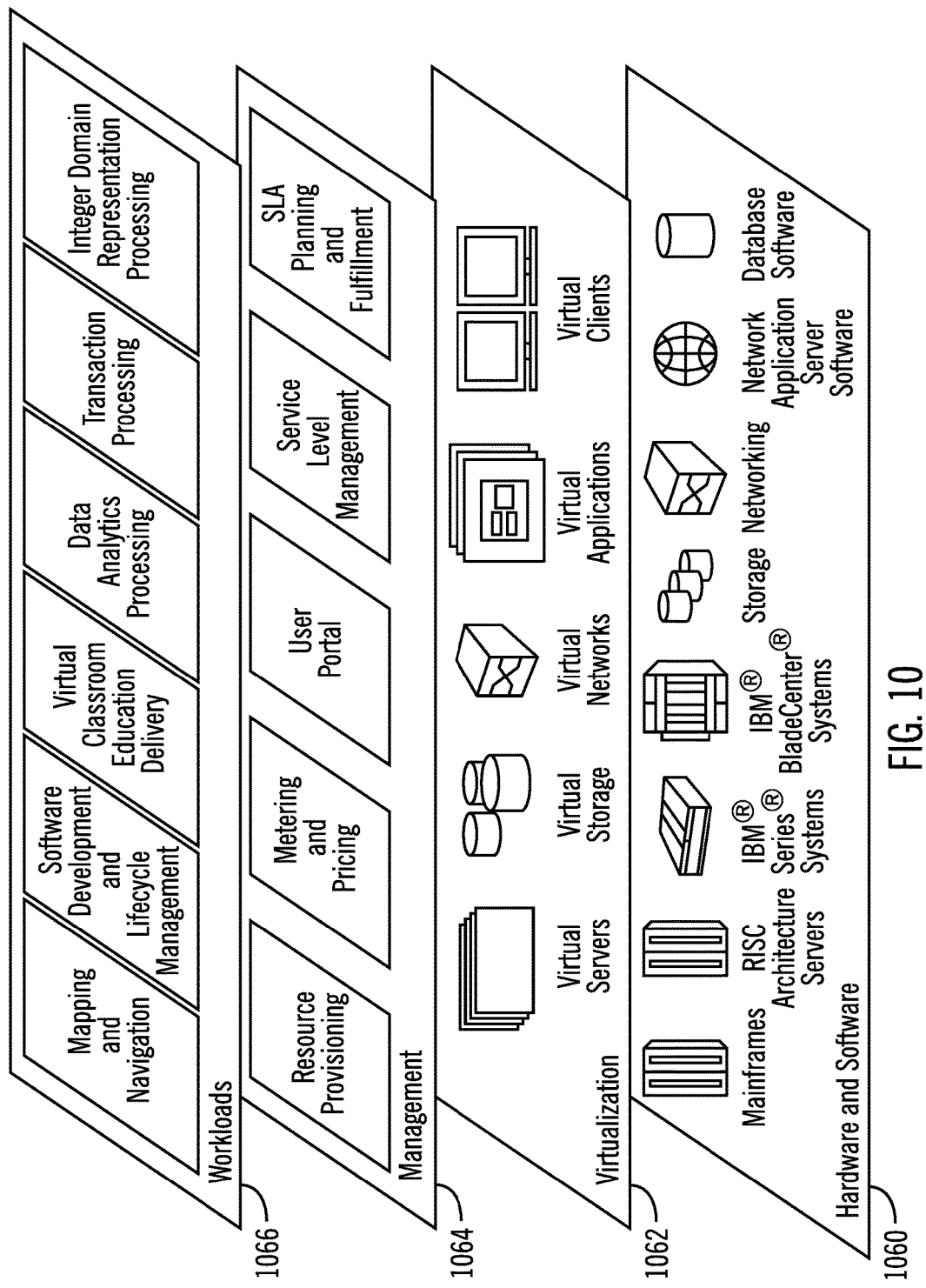
FIG. 10 illustrates abstraction model layers in accordance with certain embodiments.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1062 provides an abstraction layer from which the following examples of virtual entities may be provided: virtual servers; virtual storage; virtual networks, including virtual private networks; virtual applications and operating systems; and virtual clients.

In one example, management layer 1064 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1066 provides examples of functionality for which the cloud computing environment may be utilized. Examples of workloads and functions which may be provided from this layer include: mapping and navigation; software development and lifecycle management; virtual classroom education delivery; data analytics processing; transaction processing; and integer domain representation processing.

Thus, in certain embodiments, software or a program, implementing integer domain representation processing in accordance with embodiments described herein, is provided as a service in a cloud environment.

In certain embodiments, the computer system 100 including CPU host 105 and each GPU in the GPU farm 150 has the architecture of computing node 810. In certain embodiments, the computer system 100 is part of a cloud environment. In certain alternative embodiments, the computer system 100 is not part of a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
selecting a document from a set of documents to be analyzed;
converting a character stream from the document into a token stream based on tokenization rules;
removing irrelevant tokens from the token stream;
converting tokens remaining in the token stream into an integer domain representation based on a domain specific ontology dictionary, wherein each of the tokens is mapped to an integer based on mappings in the domain specific ontology dictionary;
storing the integer domain representation to a Graphics Processing Unit (GPU) processing queue of each of one or more GPUs;
receiving a result set from the one or more GPUs, wherein the result set includes tuples of 1) a specific pattern and 2) an offset from a beginning of the integer domain representation, and wherein the result set is generated using a compiled super Regular Expression (REGEX) that is compiled using the domain specific ontology dictionary;
storing the result set into an index for use in processing a search query; and
persisting the integer domain representation once for the document for processing of the document with a different compiled super REGEX.

2. The method of claim 1, further comprising:
persisting to the domain specific ontology dictionary any newly discovered relevant integer domain representations for new tokens for the document that are relevant to a domain of the domain specific ontology dictionary.

3. The method of claim 1, further comprising:
selecting a REGEX rule from a set of character based domain REGEX rules;
applying the domain specific ontology dictionary to map a character based REGEX to an integer based REGEX;
compiling the integer based REGEX; and
adding the compiled integer based REGEX to the super REGEX.

4. The method of claim 1, wherein the domain specific ontology dictionary is selected from a set of domain specific ontology dictionaries for different domains.

5. The method of claim 1, wherein the domain specific ontology dictionary represents domain terminology as a fixed set of integers.

6. The method of claim 1, further comprising:
   assigning a group of tokens to a group, which is assigned one integer domain representation.

7. The method of claim 1, further comprising:
   parallelizing document level extraction using REGEX processing with GPU acceleration over integers in the integer domain representation.

8. The method of claim 1, wherein a Software as a Service (SaaS) is configured to perform method operations.

* * * * *